US006490045B1

United States Patent
Dakin et al.

(10) Patent No.: US 6,490,045 B1
(45) Date of Patent: Dec. 3, 2002

(54) FIBRE OPTIC SENSOR (75) Inventors: John Philip Dakin, Romsey (GB); Stuart John Russell, Downend (GB)

(73) Assignee: University of Southhampton (GB)

( * ) Notice: Subject to any disclaimer, the term of this patent is extended or adjusted under 35 U.S.C. 154(b) by 0 days.

(21) Appl. No.: 09/806,963

(22) PCT Filed: Oct. 11, 1999

(86) PCT No.: PCT/GB99/03166

§ 371 (c)(1),
(2), (4) Date: May 25, 2001

(87) PCT Pub. No.: WO00/22383

PCT Pub. Date: Apr. 20, 2000

(30) Foreign Application Priority Data

Oct. 9, 1998 (GB) ............................................. 9821956

(51) Int. Cl.$^7$ ............................................... G01B 9/02
(52) U.S. Cl. .................................. 356/483; 250/227.19
(58) Field of Search ............................... 356/483, 463; 250/227.14, 227.16, 227.19; 385/12, 13; 372/6, 26

(56) References Cited

U.S. PATENT DOCUMENTS

| | | | |
|---|---|---|---|
| 4,898,468 A | * | 2/1990 | Udd ............................ 356/483 |
| 6,370,164 B1 | * | 4/2002 | Islam ............................. 372/6 |

FOREIGN PATENT DOCUMENTS

| | | |
|---|---|---|
| JP | 62239015 | 10/1987 |
| JP | 63195528 | 8/1988 |

OTHER PUBLICATIONS

J. P. Dakin, D.A.J. Pearce, A.P. Strong, and C.A. Wade, "A Novel Distributed Optical Fibre Sensing System Enabling Location of Disturbances in a Sagnac Loop Interferometer," in *Proceedings of the Sixth European Fibre Optic Communications/Local Area Networks Exposition,* (Information Gatekeepers Inc. (Europe), Basle, Switzerland, 1988) pp. 276–279.

Anatoli A. Chtcherbakov, Pieter L. Swart and Stephanus J. Spammer, "Dual Wavelength Sagnac–Michelson Distributed Optical Fiber Sensor," in *Proceedings SPIE* pp. 2838–2834 (1996); Distributed and Multiplexed Fiber Optic Sensors VI, Denver, Colorado, Aug. 4–9, 1996. Paper 2838–34, SPIE Proceedings, A.D. Kersey and J.P. Dakin (Eds.).

(List continued on next page.)

*Primary Examiner*—Kevin Pyo
(74) *Attorney, Agent, or Firm*—Luedeka, Neely & Graham, P.C.

(57) ABSTRACT

A Sagnac or loop type interferometer is disclosed which uses a single broadband Erbium-doped fibre source (10) and a single IngaAs detector (150) together with a 40 km long sensor loop (90). A wavelength division multiplexer (50) spectrally slices the broadband light from the source (10) into two sub-bands, with different optical paths being defined between the source (10) and detector (150) for the light in the different spectrally sliced sub-bands. The two optical paths include separate phase modulators (70, 130) which modulate the two signals at different frequencies, and also separate delay loops (60, 130) at different places relative to the sensor loop (90). Effectively, two separate Sagnac loops are provided with a single sensor loop (90), source (10) and detector (150). Standard phase locked loop techniques can be used to extract information from signals that have passed through the two loops and to determine the location of a mechanical or thermal perturbation applied to the sensor loop (90).

13 Claims, 4 Drawing Sheets

OTHER PUBLICATIONS

S.J. Spammer, P.L. Swart and A.A. Chtcherbakov, "Distributed Dual–Wavelength Sagnac Impact Sensor," *Microwave and Optical Technology Letters*, vol. 17, No. 3, Feb. 20, 1998 pp. 170–173. The authors are with the Sensors Sources and Signal Processing Research Group Faculty of Engineering, Rand Afrikaans University, Auckland Park 2006, South Africa.

S. J. Spammer, P. L. Swart and A. Booysen, "Interferometric Distributed Optical–Fiber Sensor," in *Applied Optics*, vol. 35, No. 22, Aug. 1, 1996, pp. 4522–4525. The authors are with the Sensors Sources and Signal Processing Research Group, Faculty of Engineering, Rand Afrikaans University, P. O. Box 524, Auckland Park 2006, South Africa.

Xiaojun Fang, "A Variable–Loop Sagnac Interferometer for Distributed Impact Sensing," *Journal of Lightwave Technology*, vol. 14, No. 10. Oct. 1996, pp. 2250–2254. The author is with the Telecommunication and Information Science Laboratory, University of Kansas, Lawrence, KS 66045 USA.

Erlend Ronnekleiv, Kjell Blotekjaer, and Kjell Krakenes, "Distributed Fiber Sensor For Location of Disturbances," Post–Deadline paper No. 7, *Proceedings of the $9^{th}$ Optical Fiber Sensors Conference*, Firenze, May 4–6 (1993).

* cited by examiner

FIBRE OPTIC SENSOR

This application is a national phase application of copending PCT application Ser. No. PCT/GB99/03166, filed Oct. 11, 1999, and having a priority date of Oct. 9, 1998.

FIELD OF THE INVENTION

This invention relates to a fibre optic sensor and in particular to a cyclic or Sagnac type ring interferometer for sensing mechanical or thermal disturbances, for example.

BACKGROUND OF THE INVENTION

The Sagnac or cyclic interferometer is one of several types of well known interferometer. Initially, such interferometers used a plurality of mirrors arranged so as to reflect light beams around a loop. Subsequently, the advent of laser diodes and fibre optics has allowed the development of Sagnac interferometers having a much longer path length. A light source can be injected into a wave guide which is formed by a fibre optic in the shape of a loop.

In recent years, a number of proposals have been put forward to locate mechanical or thermal disturbances occurring at any non-central location in the loop. One such arrangement is shown in "A novel distributed optical fibre sensing system enabling location of disturbances in a Sagnac loop interferometer", by J. P. Dakin, D. A. Pearce, A. P. Strong, and C. A. Wade in Proceedings SPIE, vol 838 (1987). The technique is based upon the counter-propagating nature of light in the Sagnac interferometer. When a phase perturbation, φ, occurs at a distance z from the sensor loop centre, it phase-modulates the light travelling in one direction before light travelling in the other. This results in a net phase modulation, Δφ, between the two returning counter-propagating wavetrains which interfere, when combined at the output of the loop. As set out in the above referenced paper by Dakin et al, Δφ is given by $$\Delta\phi(t) \approx \frac{2z}{V_g}\frac{d\phi(t)}{dt}$$

where $V_g$ is the group velocity of the guided light.

In initial arrangements, the value of dφ/dt was found by interfering a fraction of the light that had travelled in one direction in the Sagnac loop, with light directly from the source. In order to reduce phase noise from frequency fluctuations of the source, the latter was suitably delayed via a fibre loop to form a balanced path fibre Mach-Zehnder arrangement.

More recently, various architectures using twin-Sagnac configurations have been suggested, to avoid the need for accurately balanced paths. Some of these architectures permit the location of disturbances over sensor loop lengths of up to 800 m, although only under laboratory conditions. For example, twin-source (wavelength multiplexed) devices are shown in the papers "Dual wavelength Sagnac-Michelson distributed optical fibre sensor", Proceedings SPIE pp2838–2834 (1996) and "A distributed dual wavelength Sagnac sensor impact sensor", Microwave and optical technology letters, vol 17, No 3, pp 170–173, (1998), by S. J. Spammer, A. A. Chtcherbakov, and P. L. Swart. Other intrinsically lossy arrangements with directional 3 dB couplers and twin detectors are shown in, for example, S. J. Spammer, P. L. Swart, A. Boosen, "Interferometric distributed fibre optical sensor", Applied Optics, Vol 35, No 22, pp 4522–4523, (1996), E. Ronnekleiv, K. Blotekjaer, K. Krankes, Distributed fibre sensor for location of disturbances, Proceedings 9th OFS, PD7, (1993) X. Fang, "A variable loop Sagnac interferometer for distributed impact sensing" Optics letters, vol 21, No 6, (1996), and in U.S. Pat. No. 5,046,848.

The minimum theoretical loss of a dual Sagnac system with 3 dB couplers is 24 dB in each Sagnac.

According to the present invention there is provided a Sagnac interferometer for sensing a disturbance, the interferometer comprising: a light source arranged to generate a light signal over a range of wavelengths $\lambda_s$; an optical receiver arranged to receive light signals generated by the light source; a fibre optic loop sensor in optical communication with both the light source and the optical receiver; first optical splitter means, in optical communication with the said source, for spectrally slicing the light signal received from the source into first and second split signal channels, the first split signal channel having a range of wavelengths centred at $\lambda_1$, and the second split signal channel having a range of wavelengths centred at $\lambda_2$, wherein both $\lambda_1$ and $\lambda_2$ are subsets of $\lambda_s$ and wherein the electromagnetic energy contained in the range of wavelengths centred at $\lambda_1$ substantially does not overlap with the electromagnetic energy contained in the range of wavelengths centred at $\lambda_2$; first optical combiner means, in optical communication with the optical detector; the first split signal channel being defined along a first optical path between the optical splitter means and the optical combiner means via the loop sensor, and the second split signal channel being defined along a second optical path, different from the first optical path, between the optical splitter means and the optical combiner means via the loop sensor; the first optical path including a first optical phase angle modulating means arranged to modulate the phase angle of light in the first split signal channel at a first frequency, the first optical path having a total optical path length whose centre lies at a first non-central location around the loop sensor; the second optical path including a second optical phase angle modulating means arranged to modulate the phase angle of light in the second split signal channel at a second frequency different from the said first frequency, the second optical path having a total optical path length whose centre lies at a second non-central location different from the said first location around the loop sensor; the first optical combiner means being arranged to combine phase modulated light in the first and second split signal channels into a composite signal; the optical receiver being arranged to receive the composite light signal and to extract therefrom signal variations arising from light traversing the said first and second optical paths, whereby the distance of the disturbance around the loop sensor may be determined on the basis of the said signal variations.

The present invention provides a Sagnac loop interferometer architecture having two separate optical paths but with a single light source and a single detector. The resultant architecture has significantly lower minimum theoretical losses and is also cheaper to produce than previous arrangements which use multiple light sources and/or detectors.

Preferably, the first split signal channel defines the first optical path between the optical splitter means and the optical combiner means by traversing, in order, the first optical phase angle modulating means, the sensor loop and a first length of fibre defining a first delay loop such that the centre of the first optical path is offset relative to the centre of the sensor loop.

In that case, the second split signal channel may define the second optical path between the optical splitter means and the optical combiner means by traversing, in order, a second length of fibre defining a second delay loop, the sensor loop and the second optical phase angle modulating means, such that the centre of the second optical path is offset relative to the centre of the sensor loop in the opposite direction to the direction of offset of the centre of the first optical path.

The optical splitter means may be, for example, a wavelength division multiplexer (WDM). The light source may be a single superluminescent fibre source pumped by a laser diode producing broadband, low coherence length light. The detector may be a single p-type intrinsic n-type (PIN) semiconductor photodiode, and the first and second phase modulators may for example be piezo electric (PZT) devices.

Preferably, the first frequency of the first phase modulator and the second frequency of the second phase modulator are each Eigenfrequencies of first and second interferometer loops defined between the light source and the detector via the first and second optical paths respectively.

The optical receiver may comprise, for example, a photodiode optical detector, a low noise preamplifier and suitable signal processing software or hardware. This allows those amplitude modulated components corresponding to the variation in the optical signal amplitude to be extracted from the composite detected signal. The variations in the optical signal amplitude in turn arise from the disturbance as well as the phase modulations imparted by the phase biasing means.

Preferably, the distance z on the loop sensor at which the disturbance has occurred is determined by calculating the ratio of the fundamental and second harmonic components arising from the light which was phase modulated at the first frequency to the fundamental and second harmonic components arising from the light which was phase modulated at the second frequency In that case, the ratio may be given by:

$$\text{ratio} = \frac{J_1(xa_1)J_2(xa_2)(L+L_1-2z)}{J_1(xa_2)J_2(xa_1)(L-L_2-2z)}$$

where x is the bias modulation depth, $a_1$ and $a_2$ are constants, L is the length of the sensor loop, $L_1$ is the length of the first delay loop, $L_2$ is the length of the second delay loop, and $J_1$ and $J_2$ are first and second order Bessel functions respectively.

In further aspects of the present invention, a new configuration for an optical fibre disturbance location system is provided, based on a Sagnac loop, where light from a single broadband source is split into two separate spectral components of different wavelength, and said components of the light are directed, using wavelength-dependent splitting elements (for example, optical fibre based wavelength division multiplexer components) such that the light travels through two separate Sagnac loops, each path determined according to the wavelength region of the said components of the light, and where the light in each wavelength region is phase-modulated at a different frequency by each of two phase-biassing element, each operating at a different modulation frequency and at point in the fibre path unique to one of each of the two selected wavelength-dependent paths, and where each wavelength component passes through different optical delay paths, either before or after it passes through a common sensing section of fibre or fibre cable, where detection of disturbance is desired and where eventually all the output light from the two dependent paths is then combined onto a single optical detector, and the separate outputs from the two loops are then decoded by detection of the modulation components at the phase-biassing frequencies of the phase modulators.

The invention also extends to a Sagnac loop, where two separate optical paths are arranged between a single light source and a single optical detector and where the signals travelling around these separate paths are separated, after the initial optical detection, by virtue of frequency-dependent electronic detection of the output of the optical detector, using separate electronic lock-in amplifiers each driven by different electronic reference signals, each of said reference signals corresponding to the different phase modulation components and the second harmonic of the phase modulation components applied to the optical signals travelling in each of the two different optical paths.

BRIEF DESCRIPTION OF THE DRAWINGS

The invention may be put into practice in a number of ways, one of which will now be shown by way of example only and with reference to the following Figures in which.

DETAILED DESCRIPTION OF THE PREFERRED EMBODIMENT

Figure 1:
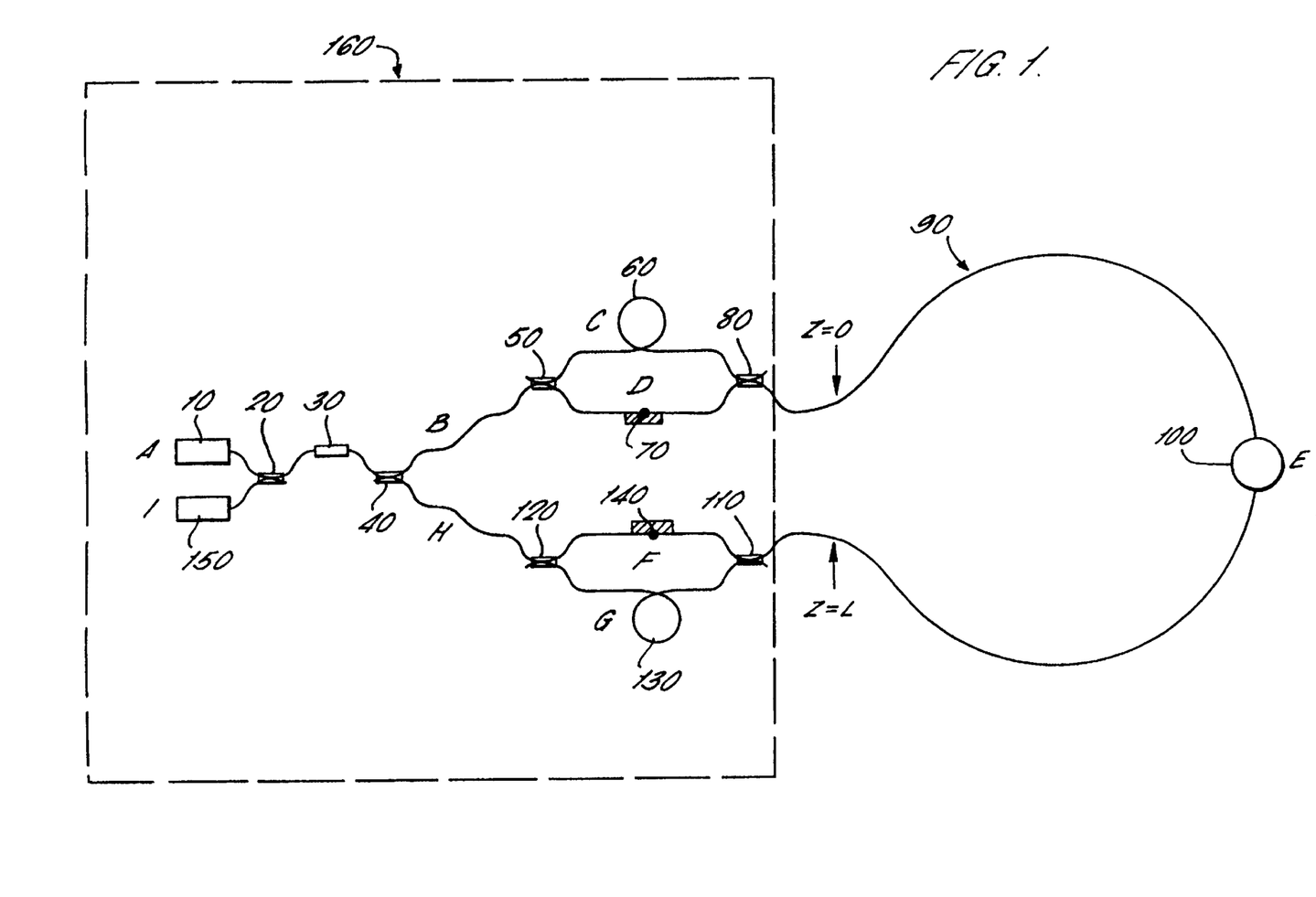
FIG. 1 shows, schematically, a fibre optic sensor embodying the present invention and including a light source, a sensor loop and a detector.

FIG. 1 shows a schematic diagram of a fibre optic sensor embodying the present invention. The sensor is supplied with light from a broadband, low coherence length source 10. In the preferred embodiment, a laser diode pump such as the Nortel LC91-20 operating at 980 nm and 80 mW is employed to excite a superluminescent fibre source which is preferably on Erbium doped silica-based fibre. A superluminescent LED or even a multi wavelength laser (or collection of lasers) could be used instead. In the case of the multi-wavelength laser, the low coherence length necessary for the source would then require a high speed modulator to be included as well in order to shorten the coherence length suitably.

The source 10 is connected via a first optical coupler 20, having a nominal loss of 3 dB, to a polariser 30. The polariser 30 is, for example, a Sifam SP15 device. As will be well known to those skilled in the art, the polariser is desirable to ensure optical reciprocity within the sensor.

The output of the polariser 30 is connected to a first of two inputs of a second 3 dB optical coupler 40. This second optical coupler 40 is a bidirectional four-port device with one of its ports unused, and for ease of explanation, the second optical coupler may be considered to have two inputs and a single output. The output of the second optical coupler 40 is connected to a first wavelength division multiplexer (WDM) 50, such as biconically fused fibre taper WDM or one based on internal dielectric filters. This device spectrally slices the broadband light generated by the source 10 into two smaller bandwidth channels. For example, with the devices specified above, the backward ASE of the sensor provides a 1 mW source 10 providing light at a central wavelength of 1555 nm and with a FWHM bandwidth of 40 nm. The first WDM 50 spectrally slices this output into upper and lower output bands having central wavelengths at 1570 nm and 1540 nm respectively.

The first WDM 50 has two outputs which are indirectly connected to two inputs of a second WDM 80. A first output of the first WDM 50 is connected to a first input of the second WDM 80 via a first delay coil 60 made of approximately 4 kilometers of fibre optic cable. Longer lengths of delay coil provide better discrimination as explained below but at the expense of increased noise. The length of the first delay coil 60 is typically accurate to within +/−0.2 km. The second output of the first WDM 50 is connected to a second input of the second WDM via a first phase modulator or fibre stretcher 70. The first phase modulator is, for example, a piezo electric (PZT) fibre stretching device, although other devices operating in accordance with the Pockles electro-optic effect can be used, as will be appreciated by those skilled in the art, such as integrated optics modulators.

The upper band of wavelengths, (spectrally split from the broad band of wavelengths generated by the source) in the illustrated example, passes along the optical path defined between the first output of the first WDM 50, through the first delay coil 60 and into the first input of the second WDM 80. By contrast, the lower band of wavelengths (again spectrally split from the broad band of wavelengths generated by the source 10) passes along the optical path defined between the second output of the first WDM 50, through the first phase modulator 70 and into the second input of the second WDM 80. The two separate bands of wavelengths which have travelled along different optical paths are recombined in the second WDM 80.

The output of the second WDM 80 is connected to a first end of a fibre optic sensor loop 90. For ease of explanation and for the purposes of the theoretical analysis set out below, the first end of the sensor loop 90 is defined to be at distance z=0. With the arrangement shown in FIG. 1 and using the components exemplified above, the sensor loop 90 may be around 40 km in length. In the present case, a sensor loop 90 having a nominal length of 40.1 km +/−0.5 km is used.

The second end of the sensor loop, defined to be at distance z=L, is connected to a port of a third WDM 110 which resplits the light (previously recombined in the second WDM 80) into the same upper and lower wavelength bands as previously. The light emitting from the second WDM 80 thus travels around the sensor loop 90 as a composite signal before being split again. A Lyot depolarizer 100 (of known design such as 3 m and 6 m lengths of Hi-Bi fibre having a 2.93 mm beat length at a wavelength of 1550 nm) is placed halfway between the second and third WDMs 80,110 i.e at a distance z=L/2 around the sensor loop 90. The Lyot depolarizer minimises polarisation fading by scrambling the polarising state of propagating light, as will be well known to those skilled in the art.

The third WDM 110 has two outputs which are indirectly connected to two inputs of a fourth WDM 120. A first output of the third WDM 110 is connected to a first input of the fourth WDM 120 via a second delay coil 130 made (as with the first delay coil 60) of approximately 4 kilometers of fibre optic cable. The length of the second delay coil 130 is likewise typically accurate to within +/−0.2 km. The second output of the third WDM 110 is connected to a second input of the fourth WDM 120 via a second phase modulator 140, again preferably constructed with a piezo electric (PZT) device.

Importantly, and in contrast to the two optical paths between the first and second WDMs 50, 80, the lower band of wavelengths, in the illustrated example, passes along the optical path defined between the first output of the third WDM 110, through the second delay coil 130 and into the first input of the fourth WDM 120. Likewise, the upper band of wavelengths passes along the optical path defined between the second output of the third WDM 110, through the second phase modulator 140 and into the second input of the fourth WDM 120. The two separate bands of wavelengths which have travelled along different optical paths are recombined in the fourth WDM 120.

An output of the fourth WDM 120 is connected to the second of the two inputs of the second 3 dB optical coupler 40. The light (once again combined as two broad bands by the fourth WDM 120) passes back through the polariser 30 and into a detector 150 via the first 3 dB optical coupler 20.

The detector 150 is preferably a simple InGaAs positive intrinsic negative (PIN) photodidde such as the Nortel DPR2SB-43T2, which has a 0.72 A/W responsivity. This is conveniently followed by a 150 kHz transimpedance amplifier such as the Theoptics TD40, 100 MOhm.

It will thus be seen that, by spectrally splitting a single broadband source into upper and lower bands, two essentially independent Sagnac interferometer loops are formed, despite having only a single sensor loop 90. In the arrangement shown in FIG. 1, the first Sagnac interferometer loop is defined along the clockwise path ABCEFHI. The second Sagnac interferometer loop is defined along the clockwise path ABDEGHI. With this arrangement, however, the effective centre of each of the two separate Sagnac interferometer loops is offset in opposite directions from the geometric centre of the sensor loop 90, which lies at z=L/2. As will be explained below, the relative offset of the centre point of the two Sagnac interferometer loops provides a different response to a common perturbation or disturbance on the sensor loop 90, which in turn allows simultaneous determination of the values of both the position, z, of this disturbance and its rate of change.

The first phase modulator 70 modulates the lower band of wavelengths using sinusoidal phase biasing at a first frequency selected from the finite set of natural Eigenfrequencies of the loops (which, despite having different centre point locations, are nominally of the same length). The second phase modulator, by contrast, modulates the upper band of wavelengths using sinusoidal phase biasing at a second frequency different from the first frequency and selected from the finite set of natural Eigenfrequencies of the loops. The bias frequencies are preferably chosen such that their frequencies, and even their difference frequencies lie above that of the expected disturbance-signals, i.e. the base bandwidth of the output of the sensor loop 90. For example, the first and second phase modulators 70, 140 may phase modulate at frequencies of 62.497 kHz and 48.561 kHz.

The abovementioned bias modulation is necessary to allow the frequency components in the detected signals from the two Sagnac interferometer loops to be electronically differentiated from one another. Bias modulation also improved the interferometer sensitivity, by operating at a high slope region of the sinusoidal response of the Sagnac interferometer to optical phase change, and also allows both Sagnac interferometer loops to share a common detector 150 by providing different frequency, amplitude-modulated carriers for each. When unperturbed, only even harmonics of the bias modulation can be observed on the signal detected by the detector 150, although, in practice, the detector 150 will normally be band-limited, to respond only to the $2^{nd}$ harmonic. However, when a different disturbance acts on the sensor loop 90, the fundamental frequency and odd harmonics appear, which may be demodulated using a lock-in technique. The signals corresponding to the odd and even harmonics for each of the Sagnac interferometer loops may easily be derived from the signals at the detector 150 using lock-in amplifiers (not shown) and the outputs may as explained below be ratioed as explained below to give an amplitude-independent result. In particular, the even and odd harmonics of the drive frequencies may be separated by two separate lock-in amplifiers (not shown), in the present example having an output filter (base-bandwidth) of 800 Hz. The bias modulation depth is suitably set to approximately 1.55 radians, to maximize the amplitude of the demodulated even harmonics. The response of the detector 150 reduces the amplitude of the third and higher harmonics, before the signals enter these lock-in amplifiers.

As explained above, the net phase modulation $\Delta \phi$ is given by $$\Delta\phi(t) \approx \frac{2z}{V_g} \frac{d\phi(t)}{dt}$$

In other words, the response expected from each of the two Sagnac interferometer loops is dependent on the rate of change of the disturbance and on its position relative to the sensor-loop centre which, due to the different locations of the first and second delay coils 60, 130 will be different for each. It will also be appreciated that only a single detector 150 is employed in the preferred embodiment. By considering the amplitude components of the light travelling in both directions around all of the allowed paths and by applying a Jacobian expansion, it is possible to model the expected signals, obtained from lock-in (homodyne) demodulation of the detected signals for each interferometer, whilst taking into account any cross talk. If the Sagnac interferometer loop defined by the path ABCEFHI is labelled "Sagnac 1" and Sagnac interferometer loop defined by the path ABDEGHI is labelled "Sagnac 2", it may be shown that (with zero crosstalk):

1) 1st Harmonic Sagnac 1, $$-\left(\frac{1}{4}\right) \cdot J_1(xa_1) \frac{d\phi_n(t)}{dt} \frac{n}{c}(L+L_1-2z)$$

2) 2nd Harmonic Sagnac 1, $$\left(\frac{1}{4}\right) \cdot J_2(xa_1)$$

3) 1st Harmonic Sagnac 2, $$-\left(\frac{1}{4}\right) \cdot J_1(xa_2) \frac{d\phi_n(t)}{dt} \frac{n}{c}(L-L_1-2z)$$

4) 2nd Harmonic Sagnac 2, $$\left(\frac{1}{4}\right) \cdot J_2(xa_2)$$

where $\phi(t)$ is a phase disturbance applied to the sensor loop 90, x is the bias modulation depth and $a_1$ and $a_2$ are constants dependent on the bias frequency and the optical path length. L is the length of the sensor loop 90, $L_1$ and $L_2$ are the lengths of the first and second delay coils 60, 130 and $J_n$ is the nth order Bessel function.

The position of the disturbance, $\phi(t)$, can be found by solving the signals simultaneously. That is, by dividing the resulting signals for each, a ratio will be found which is independent of the rate of change of the disturbance and related only to its position.

This position dependent ratio can be shown to be given by:

$$\text{ratio} = \frac{J_1(xa_1)J_2(xa_2)(L+L_1-2z)}{J_1(xa_2)J_2(xa_1)(L-L_2-2z)}$$

which can be easily solved for the disturbance's position, z.

To reduce the acoustic and seismic background noise, it is preferable to house the source 10, polariser 30, first and second delay coils 60, 130, first and second phase modulators 70, 140 and the four WDMs 50, 80, 110 and 120 in a vibration proof (acoustically isolated)housing (represented by dotted line 160 in FIG. 1) with only the sensor loop 90 external to that housing.

Figure 2:
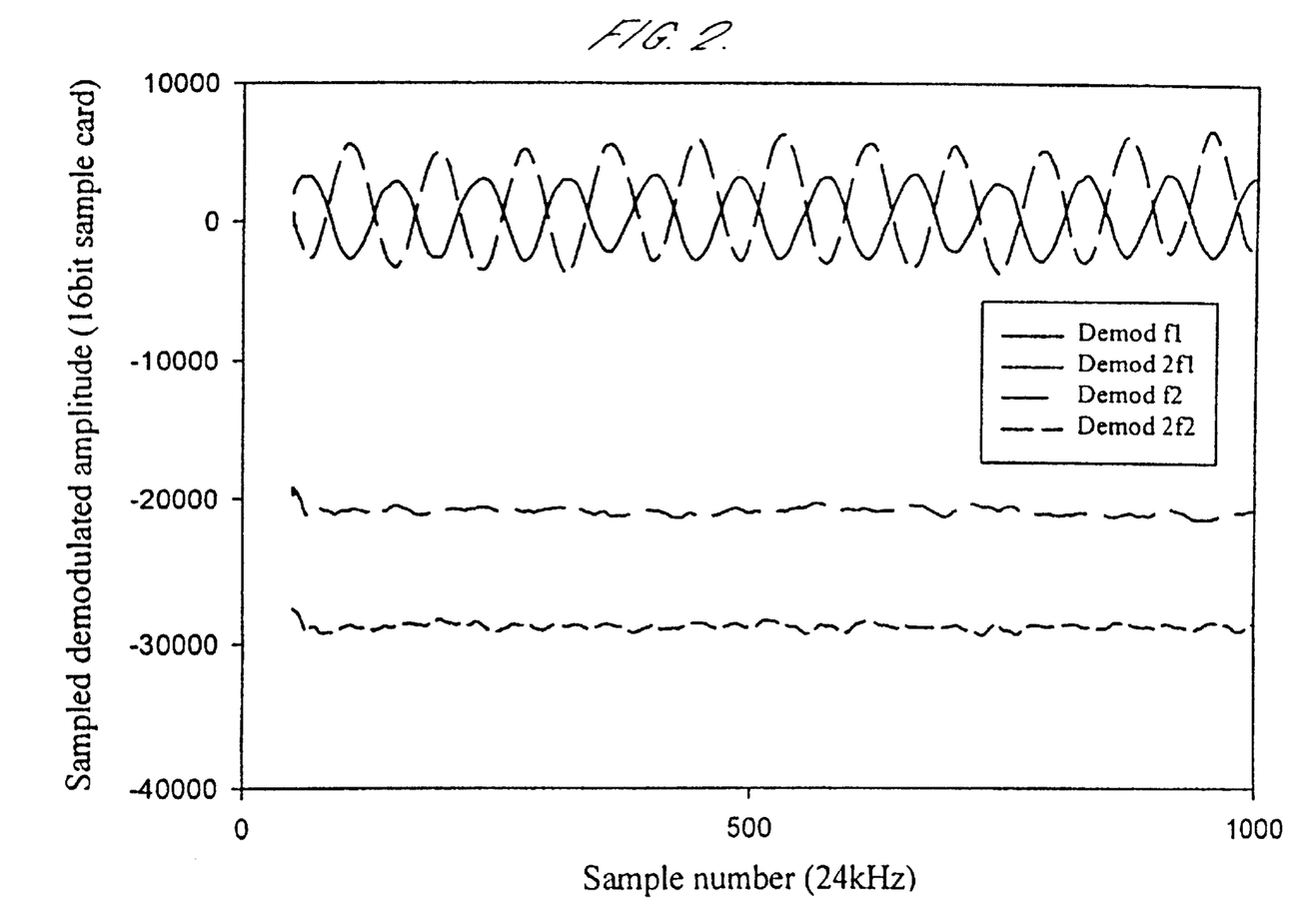
FIG. 2 shows the signals measured by the detector of FIG. 1, following demodulation.

FIG. 2 shows the demodulated signals (the fringe pattern) observed at the detector 150 when a 0.1 radian amplitude, 283 Hz phase disturbance was applied to a fibre section of the sensor loop 90 of FIG. 1, at a distance z near zero. The fringe pattern of FIG. 2 was obtained using a very low noise arrangement with the bulk of the sensor loop 90 located within the vibration proof housing. Only a few short test-sections of the sensor loop 90 were left accessible outside the vibration proof housing 160. It will of course be understood that this arrangement was used to allow the principles of the invention to be demonstrated, and that in a practical application, substantially all of the sensor loop 90 would be located outside the vibration proof housing 160. To apply as a test signal the 0.1 radian amplitude, 283 Hz phase disturbance, a simple phase modulator was constructed using a loudspeaker cone, mounted on a thin aluminium sheet, which allowed a test length from the sensor loop 90 to be simply taped onto this sheet, before being set into vibration.

The observed fringes were digitally filtered, with a pass-band of approx 20 Hz around the disturbance frequency of 283 Hz. The resulting waveforms were then divided as explained above to yield a position-dependent result.

Figure 3:
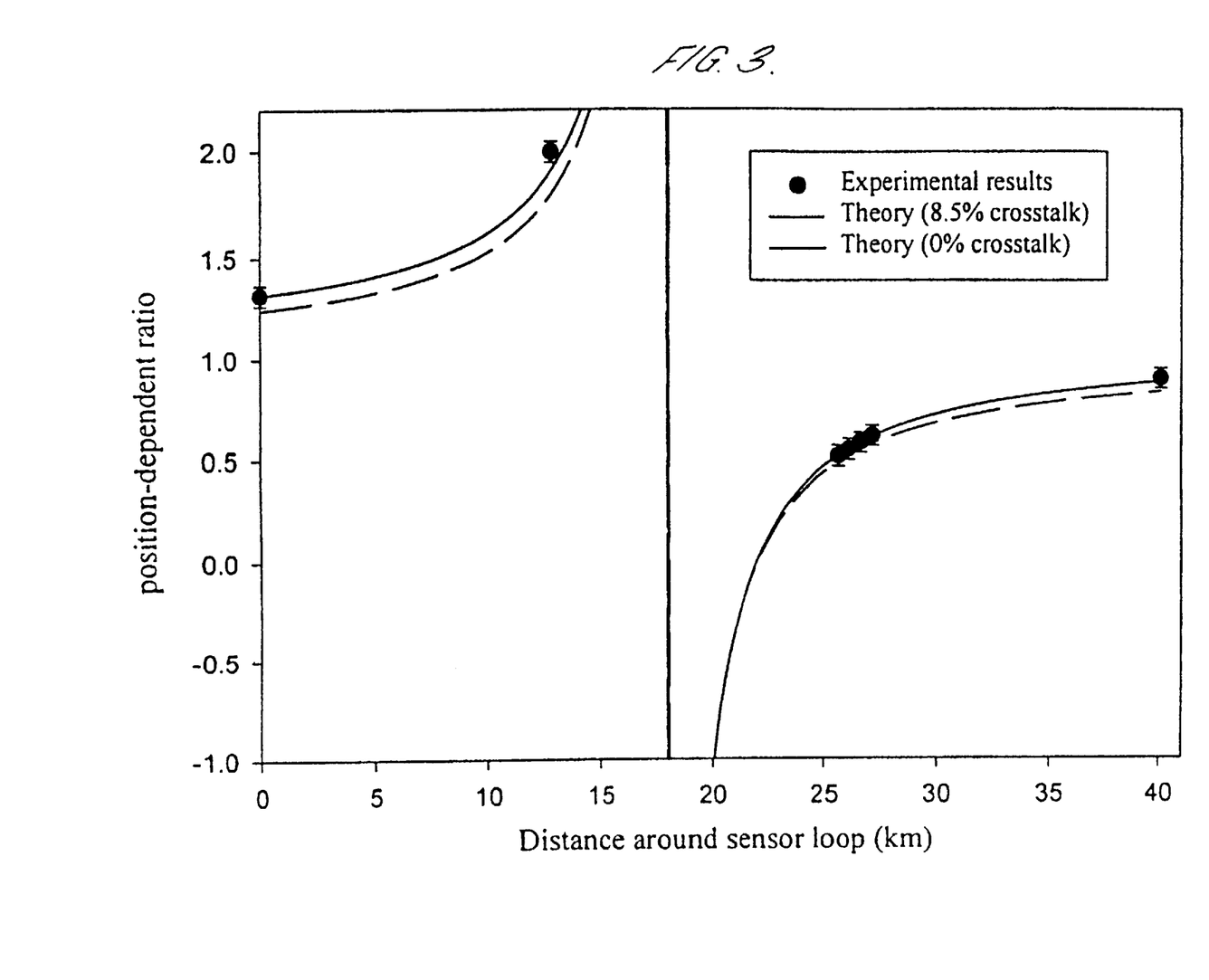
FIG. 3 shows the measured position dependent ratio obtained from the signals of FIG. 2, together with theoretical predictions of the position dependent ratios with zero optical cross-talk and 8.5% optical cross-talk respectively.

FIG. 3 shows the results of the division of the filtered fringes, together with the response (dotted lines) predicted by the above equations for the arrangement of FIG. 1.

Figure 4:
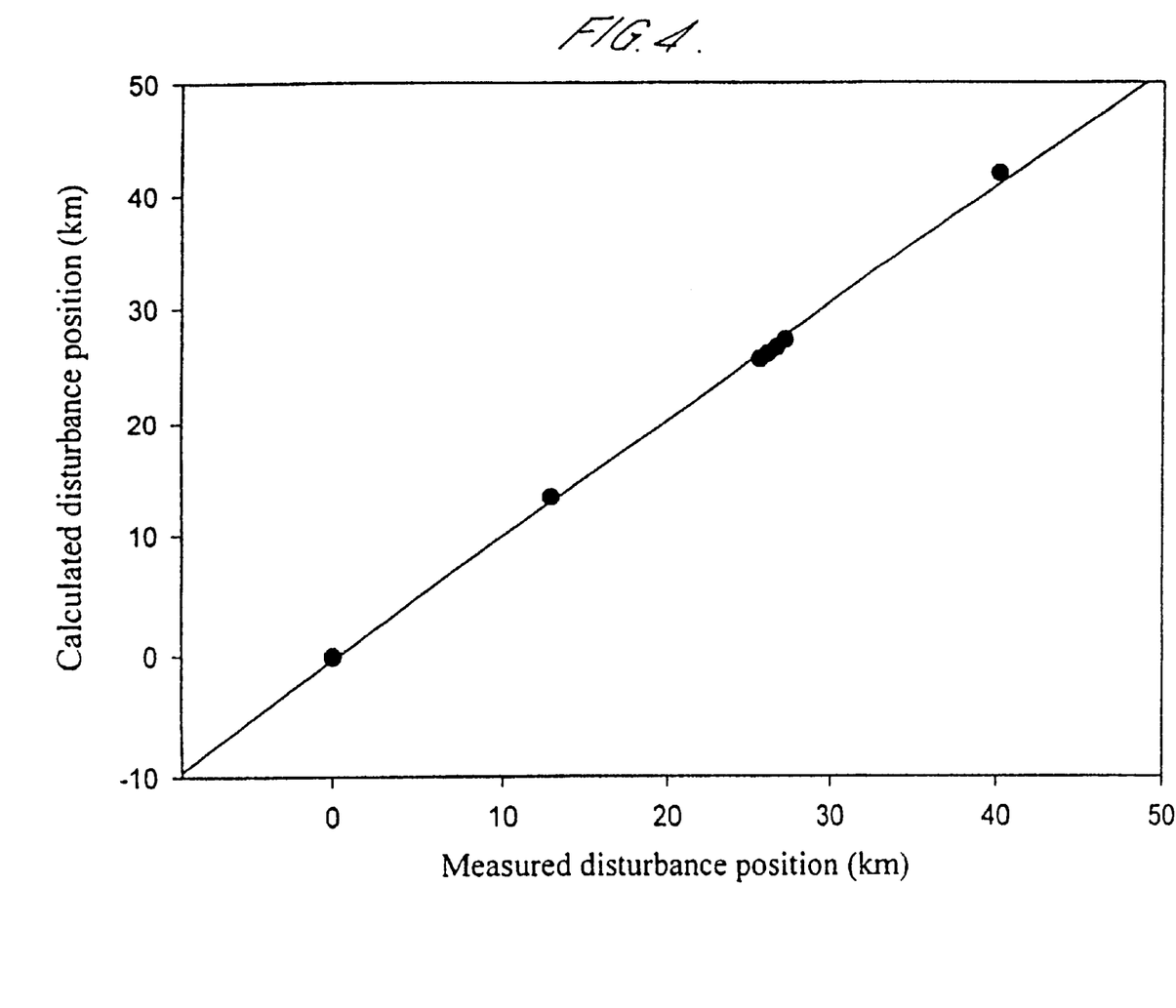
FIG. 4 shows a comparison of the actual and measured locations of a disturbance applied to the sensor loop of FIG. 1.

The 0.1 radian amplitude, 283 Hz phase disturbance was applied at further, different but known positions around the sensor loop and the ratio calculated. The positions in the loop, calculated from these results, are shown in FIG. 4, plotted against the known positions at which the disturbances were actually applied.

The WDMs currently preferred are based on dielectric filters and have a "top hat" response and have a very small level of optical cross-talk. However, early WDMs had a sinusoidal response generating a small, though finite, amount of cross talk (typically around 8.5%) between the two Sagnac interferometer loops. That is, because of the non-ideal nature of the WDMs 50, 80, 110, 120, the paths ABCEGHI and ABDEFHI (FIG. 1) will be weakly allowed. The first path allows light to travel between the source 10 and detector 150 without any bias phase modulation. This in turn causes a base band disturbance signal at the detector 150 when a perturbance is applied to the sensor loop 90. This base band disturbance signal is removed by the lock-in amplifier and by post-filtering. The second path, on the other hand, allows light to be phase biased at the frequency of both of the two phase modulators 70, 140, resulting in a small error signal at the detector 150. If there is a non-zero optical cross-talk power ratio C, then the 1st and second harmonics of the two Sagnac interferometer loops Sagnac 1 and Sagnac 2 are given by:

1) 1st Harmonic Sagnac 1, $$-2\left(\frac{1}{8} + \frac{1-C}{8}\right) \cdot J_1(xa_1)\frac{d\phi_n(t)}{dt}\frac{n}{c}(L+L_1-2z) - \\ 2\frac{C}{8}J_0(a_{2c}x)J_1(a_{1c}x)\frac{d\phi_n(t)}{dt}\frac{n}{c}(L-2z)$$

2) 2nd Harmonic Sagnac 1, $$2\left(\frac{1}{8} + \frac{1-C}{8}\right) \cdot J_2(xa_1) + 2\frac{C}{8}J_0(a_{2c}x)J_2(a_{1c}x)$$

3) 1st Harmonic Sagnac 2, $$-2\left(\frac{1}{8} + \frac{1-C}{8}\right) \cdot J_1(xa_2)\frac{d\phi_n(t)}{dt}\frac{n}{c}(L-L_2-2z) - \\ 2\frac{C}{8}J_0(a_{1c}x)J_1(a_{2c}x)\frac{d\phi_n(t)}{dt}\frac{n}{c}(L-2z)$$

4) 2nd Harmonic Sagnac 2, $$2\left(\frac{1}{8} + \frac{1-C}{8}\right) \cdot J_2(xa_2) + 2\frac{C}{8}J_0(a_{1c}x)J_2(a_{2c}x)$$

where $\phi(t)$, $x$, $a_1$, $a_2$, $L$, $L_1$, $L_2$ and $J_n$ are defined as previously. $a_{1c}$ and $a_{2c}$ are further constants. The position dependent ratio can nonetheless still be calculated from these expressions. The predicted ratio, with 8.5% cross talk, is also shown in FIG. 3.

Whilst a preferred embodiment of the invention has been described, it will be appreciated by those skilled in the art that a number of variations or modifications may be contemplated. It will be understood that the arrangement of FIG. 1 is bidirectional. In particular, terminals on the WDMs have been labelled as "inputs" and "outputs" for ease of description. In fact, whether a terminal is a notional "input" or "output" will depend entirely on the way in which light travels around the loops. In fact, the optical couplers and WDMs are sometimes four terminal devices, but unused terminals are not shown in FIG. 1 for the sake of clarity.

Furthermore, it will be appreciated that, in order to be able to obtain a measurement of the position z of the phase disturbance applied to the sensor loop 90, it is necessary only that the delay coils 60,130 are so located that the effective centre of the two Sagnac interferometer loops are at different places. Thus, the first phase modulator 70 could be placed in series with the first delay coil 60, so that the upper wavelength band is phase modulated at the first frequency and also traverses the first delay loop 60. The lower wavelength band would then simply traverse a short length of fibre between the second output of the first WDM 50 and the second input of the second WDM 80. In that case, the second phase modulator 140 would be placed in series with the second delay coil 130, so that the lower wavelength band would be phase modulated at the second frequency and would also traverse the second delay loop 130. The upper wavelength band (already both modulated and delayed) would then simply traverse a short length of fibre between the second output of the third WDM 110 and the second input of the fourth WDM 120.

Because of its low optical losses, the theoretical signal-to-noise ratio of the system of FIG. 1 is significantly lower than that of previous systems. It is expected that the location of a disturbance (for example, a heavy footfall near a part of the fibre sensor loop 90) could be measured by the arrangement of FIG. 1 to an accuracy of approximately 100 m over several tens of kilometres. A fast transient temperature change of 1–2 degrees Celcius could also be measured. The arrangement is particularly suited to the detection of disturbances whose phase changes rapidly with time.

The arrangement has many applications, such as in property perimeter monitoring, fire detection, location of a vehicle on a runway, road or railway track and so forth. The arrangement is also useful for detecting any physical tampering with a telecommunications link. Attaching the apparatus shown within the dotted line 160 of FIG. 1 to the ends of a sensor loop 90 formed from the telecommunications link permits any tampering with that link to be detected, together with the location of the tampering.

What is claimed is:

1. A Sagnac interferometer for sensing a disturbance, the interferometer comprising:

a light source arranged to generate a light signal over a range of wavelengths $\lambda_s$;

an optical receiver arranged to receive light signals generated by the light source;

a fibre optic loop sensor in optical communication with both the light source and the optical receiver;

first optical splitter means, in optical communication with the said source, for spectrally slicing the light signal received from the source into first and second split signal channels, the first split signal channel having a range of wavelengths centred at $\lambda_1$, and the second split signal channel having a range of wavelengths centred at $\lambda_2$, wherein both $\lambda_1$ and $\lambda_2$ are subsets of $\lambda_s$ and wherein the electromagnetic energy contained within the range of wavelengths centred at $\lambda_1$ substantially does not overlap with the electromagnetic energy contained within the range of wavelengths centred at $X_2$;

first optical combiner means, in optical communication with the optical receiver;

the first split signal channel being defined along a first optical path between the optical splitter means and the optical combiner means via the loop sensor and the second split signal channel being defined along a second optical path, different from the first optical path, between the optical splitter means and the optical combiner means via the loop sensor;

the first optical path including a first optical phase angle modulating means arranged to modulate the phase angle of light in the first split signal channel at a first frequency, the first optical path having a total optical path length whose centre lies at a first non-central location around the loop sensor;

the second optical path including a second optical phase angle modulating means arranged to modulate the phase angle of light in the second split signal channel at a second frequency different from the said first frequency, the second optical path having a total optical path length whose centre lies at a second non-central location different from the said first location around the loop sensor;

the first optical combiner means being arranged to combine the phase modulated light in first and second split signal channels into a composite light signal; the optical receiver being arranged to receive the composite light signal and to extract therefrom signal variations arising from light traversing the said first and second optical paths, whereby the distance of the disturbance around the loop sensor may be determined on the basis of the said signal variations.

2. The interferometer of claim 1, in which the first split signal channel defines the first optical path between the optical splitter means and the optical combiner means by traversing, in order, the first optical phase angle modulating means, the sensor loop and a first length of fibre defining a first delay loop such that the centre of the first optical path is offset relative to the centre of the sensor loop.

3. The interferometer of claim 2, in which the second split signal channel defines the second optical path between the optical splitter means and the optical combiner means by traversing, in order, a second length of fibre defining a second delay loop, the sensor loop and the second optical phase angle modulating means, such that the center of the second optical path is offset relative to the centre of the sensor loop in the opposite direction to the direction of offset of the centre of the first optical path.

4. The interferometer of claim 3, further comprising a second optical combiner means arranged between the first optical phase angle modulating means and the sensor loop, and between the first delay loop and the sensor loop, the second optical combiner means being arranged to receive a first modulated signal from the output of the first optical phase angle modulating means and a first delayed signal from the first delay loop and to output a multiplexed sensor interrogation signal onto the sensor loop.

5. The interferometer of claim 4, further comprising a second optical splitter means arranged between the sensor loop and the second optical phase angle modulating means, and between the sensor loop and the second delay loop, the second optical splitter means being arranged to receive the multiplexed sensor interrogation signal from the sensor loop and to split the said sensor signal into the said first and second split signal channels respectively.

6. The interferometer of claim 1 wherein the optical splitter means and the optical combiner means is a wavelength division multiplexer (WDM).

7. The interferometer of claim 1 wherein the light source is a single superluminescent fibre pumped by a laser diode.

8. The interferometer of claim 1 wherein the optical receiver is a single p-type intrinsic n-type (PIN) semiconductor photodiode.

9. The interferometer of claim 1 wherein the first and second optical phase angle modulating means are each Piezoelectric (PZT) fibre length modulating devices.

10. The interferometer of claim 1 wherein the first frequency of the first optical phase angle modulating means and the second frequency of the second optical angle modulating means are each Eigenfrequencies of first and second interferometer loops defined between the light source and the optical receiver via the first and second optical paths respectively.

11. The interferometer of claim 3 wherein the signal variations extracted from the composite signal by the optical receiver are obtained by detection of the modulated fundamental and second harmonic components at said first and second frequencies at which the light in the said first and second split signal channels was modulated by said first and second optical phase angle modulating means.

12. The interferometer of claim 11 wherein the distance z on the loop sensor at which the disturbance has occurred is determined by calculating the ratio of the fundamental and second harmonic components arising from the light which was phase modulated at the first frequency to the fundamental and second harmonic components arising from the light which was phase modulated at the second frequency.

13. The interferometer of claim 12 wherein the ratio is given by:

$$\text{ratio} = \frac{J_1(xa_1)J_2(xa_2)(L+L_1-2z)}{J_1(xa_2)J_2(xa_1)(L-L_2-2z)}$$

where x is the bias modulation depth, $a_1$ and $a_2$ are constants, L is the length of the sensor loop, $L_1$ is the length of the first delay loop, $L_2$ is the length of the second delay loop, and $J_1$ and $J_2$ are first and second order Bessel functions respectively.

* * * * *